UNITED STATES PATENT OFFICE.

JACOB P. MOSER, OF LOUISVILLE, KENTUCKY.

COMPOSITION FOR PAINT.

SPECIFICATION forming part of Letters Patent No. 420,082, dated January 28, 1890.

Application filed June 10, 1889. Serial No. 313,755. (No specimens.)

*To all whom it may concern:*

Be it known that I, JACOB P. MOSER, a citizen of the United States, residing at Louisville, in the county of Jefferson and State of Kentucky, have invented a certain new and useful Composition of Matter for Paint; and I do hereby declare the following to be a full, clear, and exact description of the invention, such as will enable others skilled in the art to which it appertains to make and use the same.

My composition consists of the following ingredients, combined in the proportions stated, viz: tar, forty gallons; carbonate of ammonia, two and one-half pounds; lamp-black, four pounds; whiting, nine pounds; copal varnish, two gallons; Japan drier, one gallon; coal-oil, six gallons; tincture chloride of iron, three pints.

The method of preparing my paint is as follows: I first mix the tar and carbonate of ammonia thoroughly, till all the acid is out of the tar. I then take the lamp-black, whiting, copal varnish, and Japan drier, stir them thoroughly together, and into the mixture stir the coal-oil. I then pour the latter mixture into the tar and ammonia mixture, and stir the compound well. I then add the tincture of chloride of iron and stir the whole well.

I prefer to use the Japan drier, but do not restrict myself absolutely to its use, as there are other driers which will serve substantially the same purpose.

This composition makes a durable paint, not readily affected by heat or cold, for roofs, steamboats, tarpaulins, &c. Applied to paper, it makes the paper water-proof. Paper or cloth painted with it remains pliable, and may be rolled and unrolled without cracking the paint. It is applied with whitewash-brushes or small paint-brushes, according to the material to be covered, and should be thinned, when necessary, with coal-oil.

Having thus described my invention, what I claim, and desire to secure by Letters Patent of the United States, is—

The herein-described composition of matter to be used for paint, consisting of tar, carbonate of ammonia, lamp-black, whiting, copal varnish, Japan drier, coal-oil, and tincture of chloride of iron, in the proportions specified, mixed and combined substantially as set forth.

In testimony whereof I affix my signature in presence of two witnesses.

JACOB P. MOSER.

Witnesses:
  F. G. DANNECKER,
  JOHN H. BURWINKLE.